United States Patent
Gan et al.

(10) Patent No.: US 8,837,373 B2
(45) Date of Patent: Sep. 16, 2014

(54) RELAY NODE, MAIN UNIT FOR A RELAY NODE AND METHOD THEREIN

(75) Inventors: Jiansong Gan, Beijing (CN); Zhiheng Guo, Beijing (CN); Shaohua Li, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 116 days.

(21) Appl. No.: 13/642,940

(22) PCT Filed: Nov. 1, 2011

(86) PCT No.: PCT/SE2011/051302
§ 371 (c)(1),
(2), (4) Date: Oct. 23, 2012

(87) PCT Pub. No.: WO2013/066222
PCT Pub. Date: May 10, 2013

(65) Prior Publication Data
US 2013/0107793 A1     May 2, 2013

(51) Int. Cl.
*H04W 4/00* (2009.01)
*H04W 56/00* (2009.01)
*H04B 7/155* (2006.01)
*H04W 84/04* (2009.01)
*H04W 88/08* (2009.01)

(52) U.S. Cl.
CPC ............. *H04W 56/007* (2013.01); *H04B 7/155* (2013.01); *H04W 84/047* (2013.01); *H04W 88/085* (2013.01); *H04W 56/001* (2013.01)
USPC .......................................................... 370/328

(58) Field of Classification Search
USPC ................... 370/310, 315, 328–350
See application file for complete search history.

(56) References Cited

U.S. PATENT DOCUMENTS

| 7,047,028 B2 * | 5/2006 | Cagenius ....................... 455/502 |
| 2004/0057543 A1 * | 3/2004 | Huijgen et al. ................ 375/356 |
| 2007/0281643 A1 * | 12/2007 | Kawai ......................... 455/185.1 |

OTHER PUBLICATIONS

Bonneville et al, Advanced Relay Technical Proposals, downloadable at https://ict-artist4g.eu, 161 pages, Feb. 2011.*
TSG-RAN WG1 Meeting #60, San Francisco, USA, Feb. 22-26, 2010, R1-101663, WF on UL Timing Between RN and eNB, 3 pages.
TSG-RAN WG1 Meeting #60, San Francisco, USA, Feb. 22-26, 2010, R1-101664, WF on DL Timing Between RN and eNB, 3 pages.
3GPP TR 36.814 v2.0.0 (Mar. 2010); $3^{rd}$ Generation Partnership Project; Technical Specification Group Radio Access Network; Further Advancements for E-UTRA Physical Layer Aspects (Release 9), 103 pages.

(Continued)

*Primary Examiner* — Frank Duong
(74) *Attorney, Agent, or Firm* — Nixon & Vanderhye P.C.

(57) ABSTRACT

Relay node (110), main unit (113) for a relay node and method in a main unit (113) for a relay node (110), which main unit (113) is connectible to a first radio unit (111) and to a second radio unit (112), for synchronising wireless communication over the second radio unit (112) with wireless communication over the first radio unit (111). The method comprises transmitting a synchronisation signal at the second radio unit (112), receiving the signal at the first radio unit (111), to compute a first timing difference corresponding to the signal propagation time and to adjust the downlink transmission timing at the second radio unit (112) according to the first timing difference. Similar signalling, estimation of timing difference and adjustment is made for signals to be received from the user equipment (130) at the second radio unit (112).

20 Claims, 6 Drawing Sheets

(56) References Cited

OTHER PUBLICATIONS

3GPP TS 36.216 v10.3.0 (Jun. 2011); 3$^{rd}$ Generation Partnership Project; Technical Specification Group Radio Access Network; Evolved Universal Terrestrial Radio Access (E-UTRA); Physical Layer for Relaying Operation (Release 10), 16 pages.

* cited by examiner

RELAY NODE, MAIN UNIT FOR A RELAY NODE AND METHOD THEREIN

This application is the U.S. national phase of International Application No. PCT/SE2011/051302, filed 1 Nov. 2011, the entire contents of which is hereby incorporated herein by reference.

TECHNICAL FIELD

Implementations described herein relate generally to a main unit for a relay node, a method in a main unit for a relay node and a relay node comprising a main unit and two radio units. In particular is herein described how to synchronise wireless communication via a second radio unit with wireless communication via a first radio unit.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or eNBs, may be connected via a gateway e.g. a radio access gateway, to one or more core networks.

The 3GPP is responsible for the standardization of LTE. LTE is a technology for realizing high-speed packet-based communication that may reach high data rates both in the downlink and in the uplink, and is thought of as a next generation mobile communication system relative UMTS.

Relaying is being considered for LTE Rel-10 as a tool to improve the coverage of high data rates, group mobility, temporary network deployment, the cell-edge throughput and/or to provide coverage in new areas. A relevant aspect of relaying networks is the spectrum resources used for the backhaul. One distinguishes between out-of-band and in-band relaying. In the former case, the backhaul link uses a different frequency carrier and even a different access technology than the access link uses. In this case, when using out-of-band relaying, the interference between the two links may be negligible and the two links may be managed independent of each other. In the latter case, in in-band relaying, the backhaul and the access link use the same carrier and therefore may interfere with each other.

Towards the base station, the relay node acts as a user equipment. Towards the user equipment, the relay node acts as a base station. The user equipment may not make any logical distinction between a cell created by a relay node and the cell created by a regular base station. In fact the user equipment may not even be aware of the existence of the radio backhaul connection.

A typical limitation of in-band relays is thus that they are not able to send and receive on the same channel, at the same time, i.e., they use a half-duplex communication mode. Therefore in-band-relaying may lead to increased interference and increased data- buffer lengths, causing increased delays within the network.

A type 1 relay node, which may be part of LTE-Advanced, is an in-band relay node where the backhaul link, i.e. the link between the donor base station and the relay node, and the access link, i.e. between the relay node and the user equipment, share the same spectrum.

To avoid self-interference at the relay node, and at the same time maintain backward compatibility to LTE Rel-8 user equipment, Multi-Media Broadcast over a Single Frequency Network (MBSFN) subframes are configured for the access link to create downlink transmission gaps for eNB-to-relay transmissions, as illustrated in FIG. 1. For uplink, the transmission gap is created by means of scheduling restriction.

In the present context, the expressions downlink, downstream link or forward link may be used for the transmission path from the network node, possibly via a relay node, to the user equipment. The expression uplink, upstream link or reverse link may be used for the transmission path in the opposite direction i.e. from the user equipment, possibly via a relay node, to the network node.

FIG. 1 illustrates an example of relay-to-UE communication using normal subframes (left) and eNodeB-to-relay communication using MBSFN subframes.

In an MBSFN subframe, a relay node first transmits control signal to its subordinate user equipment, then switch to receiving mode to receive data (Tx-Rx) from donor eNB, and then switch to transmitting mode again (Rx-Tx). For uplink, the Tx-Rx switch and Rx-Tx switch are also needed. Due to implementation restrictions in the radio unit, some time is needed for the switch from Tx to Rx and from Rx to Tx, which may be referred to as switch time.

For different length of switch time, the timing relationship between backhaul and access link may be different, which has between discussed in 3GPP. Assume the relay node may receive Un downlink transmissions starting with Orthogonal Frequency-Division Multiplexing (OFDM) symbol numbered m and it may stop receiving with the OFDM symbol numbered n, and k is equal to the number of OFDM symbols used for the L1/L2 control region at the relay node access. For downlink, the following two cases may be considered:

Case 1: the relay node may receive the downlink backhaul subframe starting from OFDM symbol m=k+1 until the end of the subframe (n=13 in case of normal cyclic prefix). This corresponds to the case when the relay node switching time is longer (>cyclic prefix) and relay node downlink access transmit time is slightly offset with respect to downlink backhaul reception time at the relay node.

Case 2: the relay node may receive the downlink backhaul subframe starting from OFDM symbol m=k until the end of the subframe (n=13 in case of normal cyclic prefix). This corresponds to the case when the relay node switching time is sufficiently shorter than the cyclic prefix and relay node downlink access transmit time is aligned to the downlink backhaul reception time at the relay node.

For uplink, similar timing relationships may comprise:

Case 1: the relay node may transmit Single-Carrier Frequency-Division Multiple Access (SC-FDMA) symbols m=1 until the end of the uplink backhaul subframe (n=13 in case of normal cyclic prefix). This corresponds to the case when the access link and backhaul link uplink subframe boundary is staggered by a fixed gap.

Case 2: the relay node may transmit SC-FDMA symbols m=0 until the end of the uplink backhaul subframe (n=13 in case of normal cyclic prefix).

This corresponds to the case when the access link uplink subframe boundary is aligned with the backhaul link uplink subframe boundary and relay node switching time is sufficiently shorter than the cyclic prefix (case 2a).

Alternatively, this corresponds to the case when the access link and backhaul link uplink subframe boundary is staggered by a fixed gap and relay node switching time is considered by configuring the user equipment not to transmit the last SC-FDMA symbol of the Uu link (case 2b).

3GPP work focuses mainly on cases that the switch time of the relay node is larger than the cyclic prefix. For switch time less than the cyclic prefix, no solution is provided. When the relay node switch time is less than the cyclic prefix (4.7 ps in cases of normal cyclic prefix), there is no OFDM symbol reserved for Tx-Rx and Rx-Tx switch. In such case, accurate timing alignment between access link and backhaul link is needed, otherwise interference will be introduced. This requirement is even stricter when a Main Unit-Remote Radio Unit (MU-RRU) architecture is used for the relay node and the relay node's backhaul side antenna and access side antenna are situated far apart from each other.

As the subsequent disclosure exclusively relates to half-duplex in-band relay nodes, the term in-band is omitted in the subsequent text. By "relaying" it is herein meant "in-band relaying", unless otherwise stated.

A common problem when relaying in half-duplex is that effective data-rate performance for some user equipment may actually be degraded when using relay nodes.

However, the limitation of half duplex transmission over the backhaul link also leads to a situation where the end-to-end data rate performance decrease when transmitting via the relay node, in comparison to direct transmission from the base station, as the resources have to be shared between the backhaul link and the link between the relay node and the user equipment. There may also be a delay in the relay node when shifting from receiving signals from the base station over the backhaul link and transmitting signals to the user equipment within the own cell, leading to a degradation of performance within the wireless communication system.

Thus there is a desire for improvements in communication systems comprising relay nodes.

SUMMARY

It is therefore an object to obviate at least some of the above mentioned disadvantages and to improve the performance in a wireless communication system.

According to a first aspect, the object is achieved by a method in a main unit for a relay node, which main unit is connectible to a first radio unit and to a second radio unit. The method aims at synchronising wireless communication over the second radio unit with wireless communication over the first radio unit. The main unit is configured for wireless communication with a donor base station via the first radio unit and configured for wireless communication with a user equipment via the second radio unit. The method comprises transmitting, via the second radio unit, a synchronisation signal. The transmitted synchronisation signal is then received at the first radio unit, wherein information concerning reception of the synchronisation signal at the first radio unit is received at the main unit. Further, a first timing difference corresponding to the time it takes for the synchronisation signal to propagate from the second radio unit to being received at the first radio unit is computed. The downlink transmission timing at the second radio unit is then adjusted according to the first timing difference. Further a reference signal is transmitted via the first radio unit. Information concerning reception of the reference signal at the second radio unit is then received at the main unit. A second timing difference, corresponding to the time it takes for the reference signal to propagate from the first radio unit to being received at the second radio unit is then estimated. Further, the expected timing for signals to be received from the user equipment at the second radio unit is adjusted according to the second timing difference.

According to a second aspect, the object is achieved by a main unit for a relay node. The main unit is connectible to a first radio unit and to a second radio unit. The main unit is configured for synchronising wireless communication over the second radio unit with wireless communication over the first radio unit. The main unit is configured for wireless communication with a donor base station via the first radio unit and configured for wireless communication with a user equipment via the second radio unit. The main unit comprises an input/output interface, configured to communicate with the first radio unit and the second radio unit. Further, the main unit comprises a processing circuitry, configured to compute a first timing difference corresponding to the time it takes for the synchronisation signal to propagate from the second radio unit to being received at the first radio unit. The processing circuitry is further configured to adjust the downlink transmission timing at the second radio unit according to the first timing difference. The processing circuitry is further configured to estimate a second timing difference, corresponding to the time it takes for the reference signal to propagate from the first radio unit to being received at the second radio unit and to adjust the expected receiving timing for signals to be received from the user equipment at the second radio unit according to the second timing difference.

According to a third aspect, the object is achieved by a relay node. The relay node comprises a main unit, a first radio unit configured for wireless communication with a donor base station, and a second radio unit configured for wireless communication with a user equipment. The relay node is configured for synchronising wireless communication over the second radio unit with wireless communication over the first radio unit. The second radio unit comprises a second unit transmitter, configured to transmit a synchronisation signal. The first radio unit comprises a first unit receiver, configured to receive the synchronisation signal. Further, the first radio unit comprises a first unit transmitter configured to transmit a reference signal. The second radio unit comprises a second unit receiver, configured to receive the reference signal.

Thanks to embodiments of the present relay node, main unit for a relay node and methods therein, by estimating the timing difference corresponding to the signal propagation time between the first radio unit and the second radio unit, the wireless communication may be synchronised between the signalling over the second radio unit with wireless communication over the first radio unit, which first radio unit in turn may be synchronised with the donor base station.

By not reserving any special OFDM symbols for the relay node switch time, which has been proved to work over air in test bed, when two sets of radio units are used for the relay node and these radio units are situated apart from each other, at a distance rendering a signalling propagation time.

The proposed solution renders accurate timing alignment between access link and backhaul link, and hence avoids the risk of introducing backhaul-access interference of the relay node. Further, this timing alignment method is fully complied with the relay standard in 3GPP. Thus is an improved performance within the wireless communication system is achieved.

Other objects, advantages and novel features will become apparent from the following detailed description of the present method and user equipment.

BRIEF DESCRIPTION OF THE DRAWINGS

The methods, the main unit for a relay node and the relay node are described in more detail with reference to attached drawings illustrating examples of embodiments in which.

DETAILED DESCRIPTION

Embodiments herein are defined as a main unit for a relay node, a method in a main unit for a relay node and a relay node comprising a main unit and two radio units, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
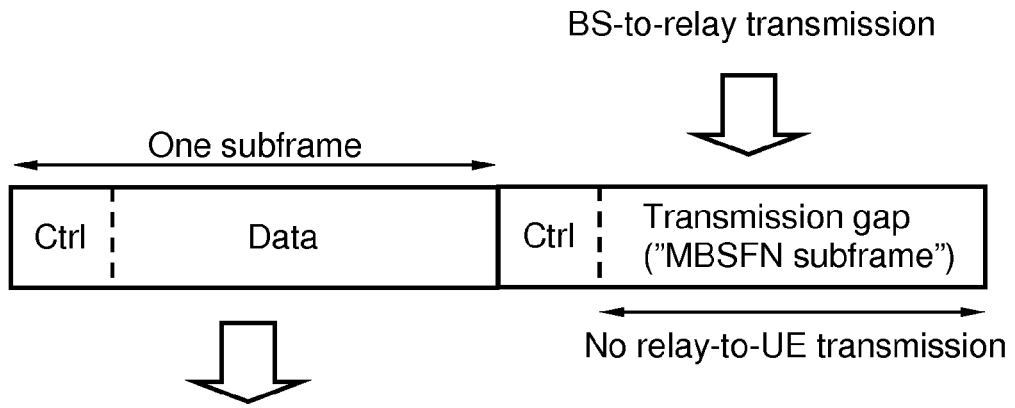
FIG. 1 is a schematic block diagram illustrating subframes for communication according to prior art.
Figure 2:
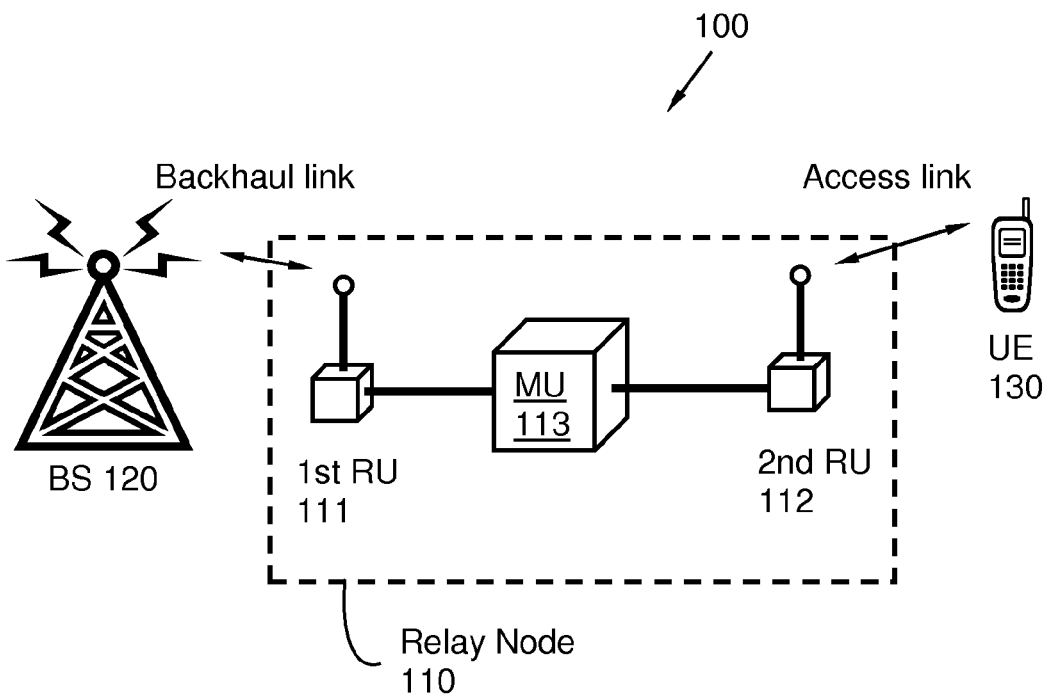
FIG. 2 is a schematic block diagram illustrating an example of a wireless communication system according to some embodiments.

FIG. 2 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1× RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies. The subsequently described explanations and embodiments are exemplified in an FDD LTE environment, as a non-limiting example. However the methods and apparatuses may easily be generalized and applied to e.g. a TDD LTE system, and also to cellular systems other than based on the LTE standard, or in fact any other cell based access technology where in-band relaying may be applied.

The purpose of the illustration in FIG. 2 is to provide a simplified, general overview of the methods, main units and relay nodes herein described, and the functionalities involved. The methods, main units and relay nodes will subsequently, as a non-limiting example, be described in a 3GPP/LTE environment, but the embodiments of the disclosed methods, main units and relay nodes may operate in a wireless communication system 100 based on another access technology.

The wireless communication system 100 comprises a relay node 110, a base station 120 and a user equipment 130, wherein the base station 120 and the user equipment 130 are arranged to communicate with each other via the relay node 110.

The relay node 110, which also may be referred to as a repeater, a broadcast relay station, a relay transmitter, a broadcast translator, a rebroadcaster, a relay link, or a two-way radio, comprises a first radio unit 111, a second radio unit 112 and a main unit 113. The first radio unit 111 and the base station 120 may communicate with each other over a backhaul link. Correspondingly, the second radio unit 112 and the user equipment 130 may communicate with each other over an access link. The relay node 110 is configured to operate in an Amplify-and-Forward mode and/or a Decode-and-Forward mode according to some embodiments.

Further, the relay node 110 may comprise a Main Unit - Remote Radio Unit (MU-RRU) architecture, according to some embodiments. In such MU-RRU architecture, the remote radio units, i.e. the first radio unit 111 and the second radio unit 112, comprises, or are connectable/attachable to transmit and receive antennas, while the baseband signal generation, modulation, demodulation, coding and/or framing functionality may be situated at the main unit 113. The remote first radio unit 111 and the remote second radio unit 112 may be placed at a quite long distance from the main unit 113. The first radio unit 111, the second radio unit 112 and the main unit 113 may be connected by optical fibre or any other appropriate wired or wireless connection, according to different embodiments.

The user equipment 130 is configured to transmit radio signals comprising information to be received by the base station 120 via the relay node 110. Contrariwise, the user equipment 130 is configured to receive radio signals comprising information transmitted by the base station 120 via the relay node 110. The communication between the base station 120 and the user equipment 130 is thus made over the relay node 110.

It is to be noted that the illustrated network setting of relay node 110, a base station 120 and a user equipment 130 in FIG. 2 is to be regarded as a non-limiting embodiment only. The wireless communication network 100 may comprise any other number and/or combination of relay nodes 110, base stations 120 and user equipment 130, although only one instance of a relay node 110, base station 120 and user equipment 130, respectively, are illustrated in FIG. 2 for clarity reasons. A plurality of relay nodes 110, base stations 120 and user equipment 130 may further be involved in the present methods according to some embodiments.

Thus whenever "one" or "a/an" relay node 110, base station 120 and/or user equipment 130 is referred to in the present context, a plurality of relay nodes 110, base stations 120 and/or user equipment units 130 may be involved, according to some embodiments.

The base station 120 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 130 over a wireless interface, depending e.g. of the radio access technology and terminology used.

In the illustrated scenario in FIG. 2, the base station 120 is a donor base station in relation to the relay node 110.

The user equipment 130 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a tablet personal computer, a Customer Premises Equipment (CPE), a Fixed Wireless Access (FWA) nodes or any other kind of device configured to communicate wirelessly with the base station 120 via the relay node 110.

The base station 120 controls the radio resource management within a cell, such as e.g. allocating radio resources to the user equipment units 130 within the cell and ensuring reliable wireless communication link between the base station 120 and the user equipment 130 via the relay node 110. The base station 120 may comprise an eNodeB, e.g. in an LTE-related wireless communication system 100.

The methods and apparatuses disclosed herein provide a solution to maximize, or at least somewhat increase the resource for backhaul transmissions when the Tx-Rx switch time and Rx-Tx switch time may be controlled within a cyclic prefix. A close-loop solution is disclosed to make sure there is no, neglectible or low interference over the air, even though there are delay due to Common Public Radio Interface (CPRI) transmission and over-the-air propagation delay.

To avoid backhaul-access interference when no OFDM symbol is reserved for switch time, the timing of the first radio unit 111 and the second radio unit 112 may be aligned over the air. According to some embodiments:

1) The signal from the second radio unit 112 may be aligned with the signal from donor base station 120 at the receiving antenna of the first radio unit 111;

2) The signal from the first radio unit 111 may be aligned with the signal from the relay node's subordinate user equipment 130 at the receiving antenna of the second radio unit 112.

Figure 3:
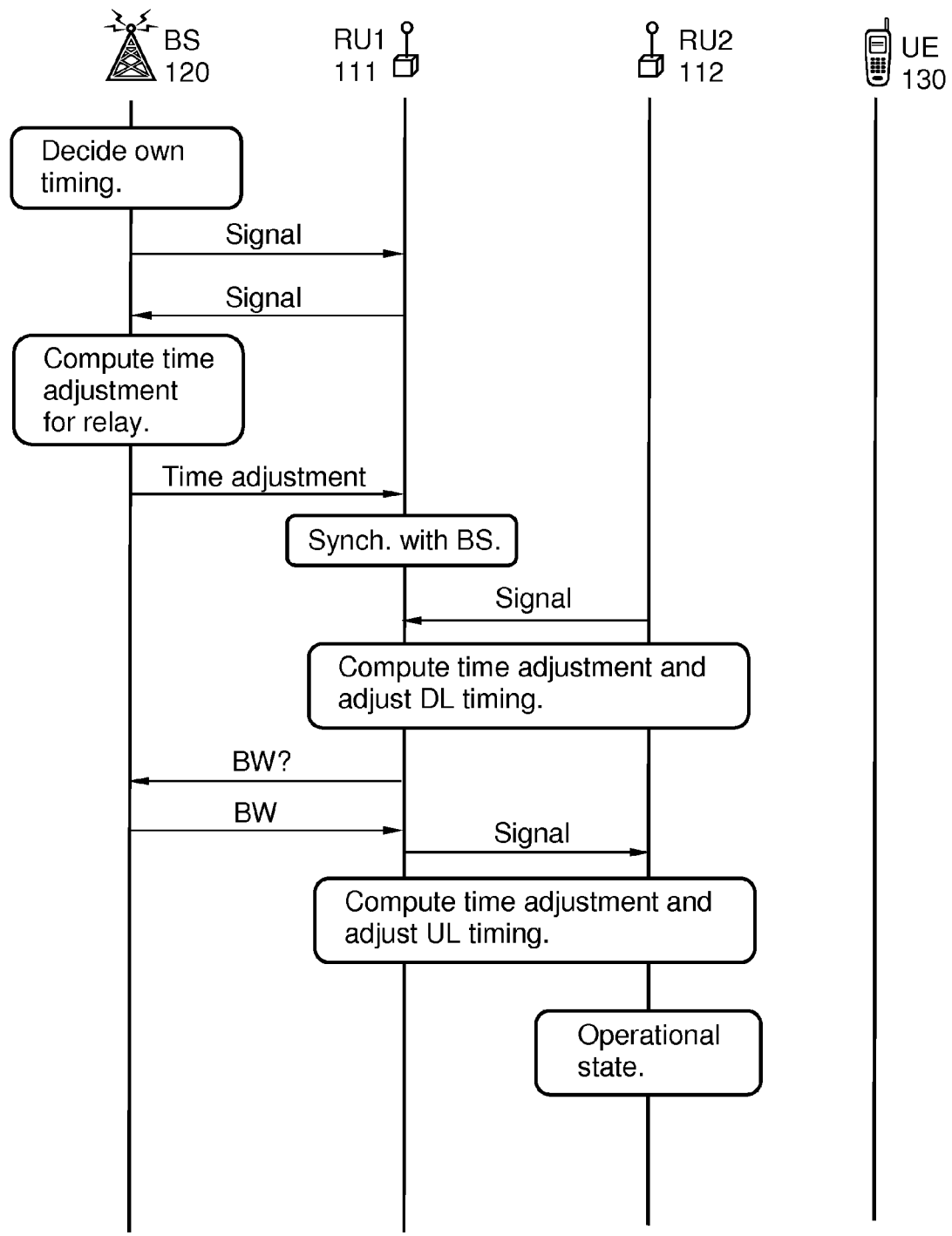
FIG. 3 is a combined flow chart and signalling scheme illustrating an example of an embodiment.

FIG. 3 schematically illustrates an example of the interaction between the base station 120, the first radio unit 111 and the second radio unit 112 comprised in the relay node 110 and the user equipment 130, according to some embodiments.

The method may comprise a plurality of actions, in order to perform access backhaul timing alignment for relay nodes 110, such as e.g. the actions subsequently described in this non-limiting embodiment.

However, the described actions may be performed in a somewhat different order than the herein utilised order of appearance, which is merely exemplary according to different embodiments. Also, some of the described actions may be performed within some alternative embodiments, but not necessarily within all embodiments, while some further additional actions, described in more detail elsewhere within this disclosure may be performed within some alternative embodiments.

Firstly, the donor base station 120 may decide its own timing. Thus, the timing of the donor base station 120 may be fixed, and the first radio unit 111 synchronises to donor base station 120 over air. Then the second radio unit 112 goes to pre-operation state and starts transmitting a signal such as e.g. a Primary Synchronisation Signal (PSS). The first radio unit 111 detects the transmitted signal, or PSS, from the second radio unit 112, estimates the timing difference and then informs the second radio unit 112 about the timing difference via relay-internal signalling. Once received the timing difference from the first radio unit 111, the second radio unit 112 may adjust is downlink transmission timing. The first radio unit 111 may send a scheduling request for dummy data transmission. With granted scheduling opportunity, the first radio unit 111 may send dummy data in Physical Uplink Shared Channel (PUSCH). Or as an alternative, Physical Random Access Channel (PRACH) preamble may be sent to the second radio unit 112. The second radio unit 112 estimates the timing offset based on the relay node 110 from the first radio unit 111, or preamble from the first radio unit 111 according to some embodiments, and adjust its expected receiving timing in uplink. Till now the timing was aligned for both downlink and uplink, and relay node 110 changes to operational state as normal base station.

Figure 4A:
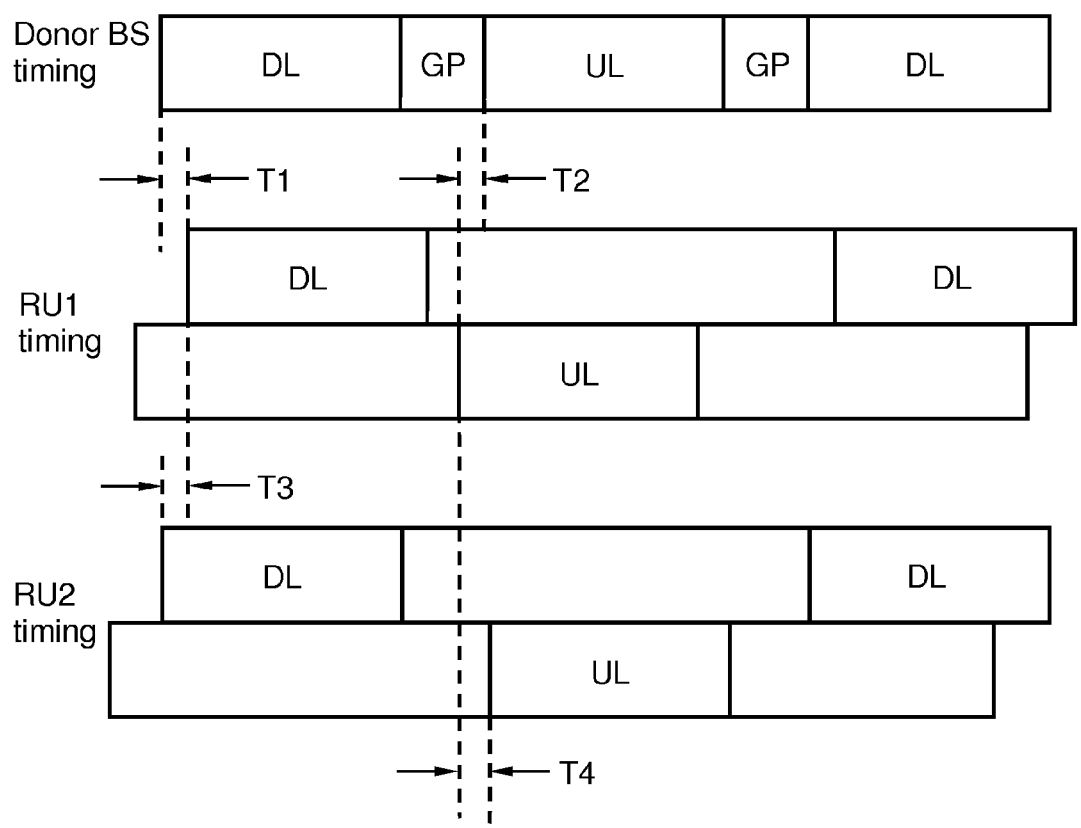
FIG. 4A is a block diagram illustrating timing relationship according to an embodiment of the present method.

FIG. 4A shows the timing relationship between donor base station 120, the first radio unit 111 and the second radio unit 112 comprised in the relay node 110, in a TDD environment. The donor base station 120 timing is fixed. To make communication between the donor base station 120 and the first radio unit 111 possible, the first radio unit 111 has to align with the donor base station 120 over the air. This alignment is the same as conventional synchronisation between the donor base station 120 and the user equipment 130. Once the timing of the first radio unit 111 is decided, the second radio unit 112 may set its timing to meet the above two requirements: the second radio unit 112 downlink transmission T3 ahead of the first radio unit 111 receiving timing to compensate the propagation delay of T3 from the second radio unit 112 to the first radio unit 111. The second radio unit 112 uplink receiving is T4 behind the first radio unit 111 transmission timing to compensate the propagation delay of T4 from the first radio unit 111 to the second radio unit 112. As neither T3 nor T4 is known at the second radio unit 112, a close-loop scheme is proposed in this disclosure to get the timing alignment.

Figure 4B:
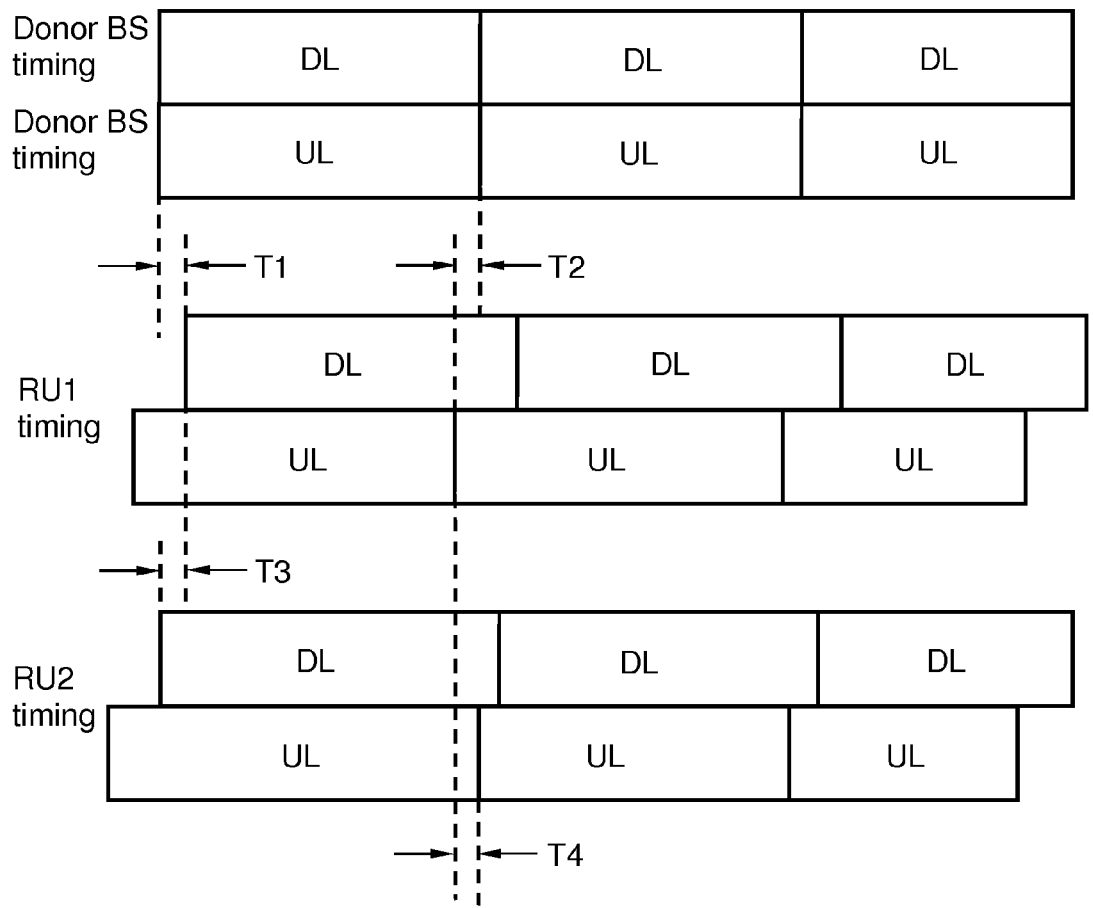
FIG. 4B is a block diagram illustrating timing relationship according to an embodiment of the present method.

A corresponding example in FDD is illustrated in FIG. 4B.

Figure 5:
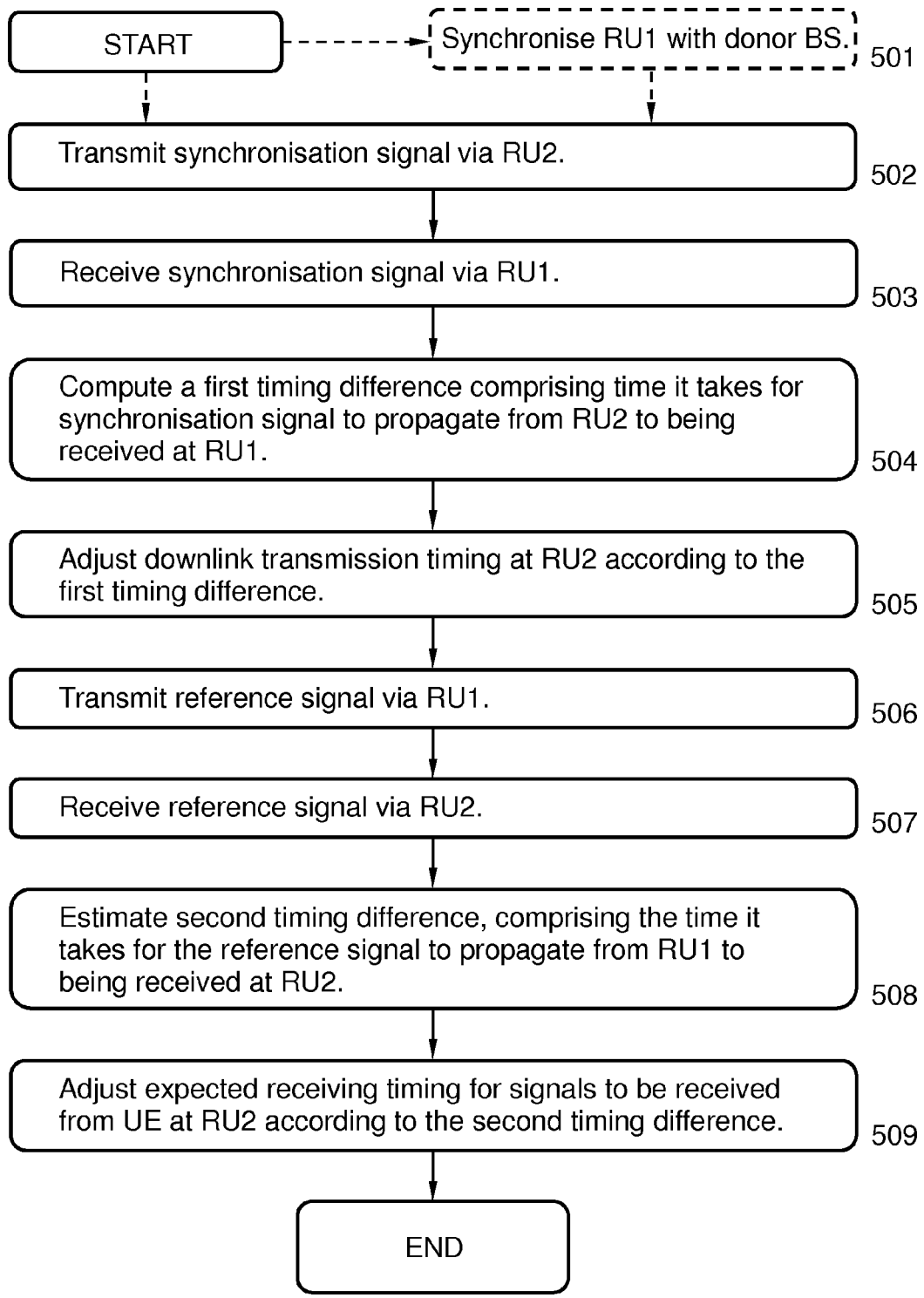
FIG. 5 is a schematic flow chart illustrating examples of actions comprised in embodiments of the present method in a main unit for a relay node.

FIG. 5 is a flow chart illustrating embodiments of a method in a main unit 113 for a relay node 110. The main unit 113 is connectible to a first radio unit 111 and to a second radio unit 112. The method aims at synchronising wireless communication over the second radio unit 112 with wireless communication over the first radio unit 111. The main unit 113 is configured for wireless communication with a donor base station 120 via the first radio unit 111 over a backhaul link. The main unit 113 is also configured for wireless communication with a user equipment 130 via the second radio unit 112 over an access link. The wireless communication may be made in half-duplex communication mode.

The relay node 110, the donor base station 120 and/or the user equipment 130 may be comprised in a wireless communication system 100.

The wireless communication system 100 may be based on Long-Term Evolution (LTE) within the Third Generation Partnership Project (3GPP) according to some embodiments, wherein the relay node 110 and the donor base station 120 may have a base station-relay node relationship. The donor base station 120 may comprise an Evolved Node B, according to some embodiments. The main unit 113 may be comprised in a relay node 110 together with the first radio unit 111 and the second radio unit 112, constituting a Main Unit-Remote Radio Unit, MU-RRU, architecture, wherein the first radio unit 111 and the second radio unit 112 are remote radio units, connected to the main unit 113, according to some embodiments.

According to some embodiments, no Orthogonal Frequency Division Multiplexing (OFDM) symbol may be reserved for the time it takes for any, or both, of the first radio unit 111 and/or the second radio unit 112 to switch between transmitting and receiving radio signals.

The time it takes for any, or both, of the first radio unit 111 and/or the second radio unit 112 to switch between transmitting and receiving radio signals may be less than the length of a Cyclical Prefix, according to some embodiments. The herein described actions may be performed for example when setting up the relay node 110 according to some embodiments, or periodically at an interval.

To appropriately synchronise wireless communication over the second radio unit 112 with wireless communication over the first radio unit 111, the method may comprise a number of actions 501-509.

It is however to be noted that some of the described actions may be performed in a somewhat different chronological order than the enumeration indicates. Also, it is to be noted that some of the actions such as e.g. 501 may be performed within some alternative embodiments. Further, any, some or all actions, such as e.g. 502-505 and/or 506-509 may be performed simultaneously or in a rearranged chronological order. The method may comprise the following actions:

Action 501

This action may be comprised within some alternative embodiments, but not necessarily within all embodiments of the method.

The first radio unit 111 may be synchronised with the donor base station 120.

Action 502

A synchronisation signal may be transmitted, via the second radio unit 112.

The transmission of the synchronisation signal via the second radio unit 112 may comprise a Primary Synchronisation Signal (PSS), according to some embodiments.

Action 503

Information concerning reception of the synchronisation signal at the first radio unit 111 is received.

Action 504

A first timing difference, corresponding to the time it takes for the synchronisation signal to propagate from the second radio unit 112 to being received at the first radio unit 111 is computed.

Action 505

The downlink transmission timing is adjusted at the second radio unit 112 according to the first timing difference.

The adjustment of the downlink transmission timing at the second radio unit 112 according to the first timing difference may comprise prolonging the downlink transmission timing with the time it takes for the synchronisation signal to propagate from the second radio unit 112 to being received at the first radio unit 111.

Action 506

A reference signal is transmitted via the first radio unit 111.

The transmission of the reference signal via the first radio unit 111, may be preceded by transmission of a scheduling request, transmitted via the first radio unit 111, to be received by the donor base station 120.

The transmission of the reference signal via the first radio unit 111 may comprise transmission of dummy data over a Physical Uplink Shared Channel (PUSCH) if the scheduling request is granted.

The transmission of the reference signal via the first radio unit 111 may comprise a transmission made over Physical Random Access Channel (PRACH).

Action 507

Information concerning reception of the reference signal is received at the second radio unit 112.

Action 508

A second timing difference, corresponding to the time it takes for the reference signal to propagate from the first radio unit 111 to being received at the second radio unit 112 is estimated.

Action 509

The expected timing for signals to be received from the user equipment 130 at the second radio unit 112 is adjusted according to the second timing difference.

The adjustment of the expected timing for signals to be received from the user equipment 130 at the second radio unit 112 according to the second timing difference may comprise prolonging the uplink transmission timing with the time it takes for the reference signal to propagate from the first radio unit 111 to being received at the second radio unit 112, according to some embodiments.

Figure 6:
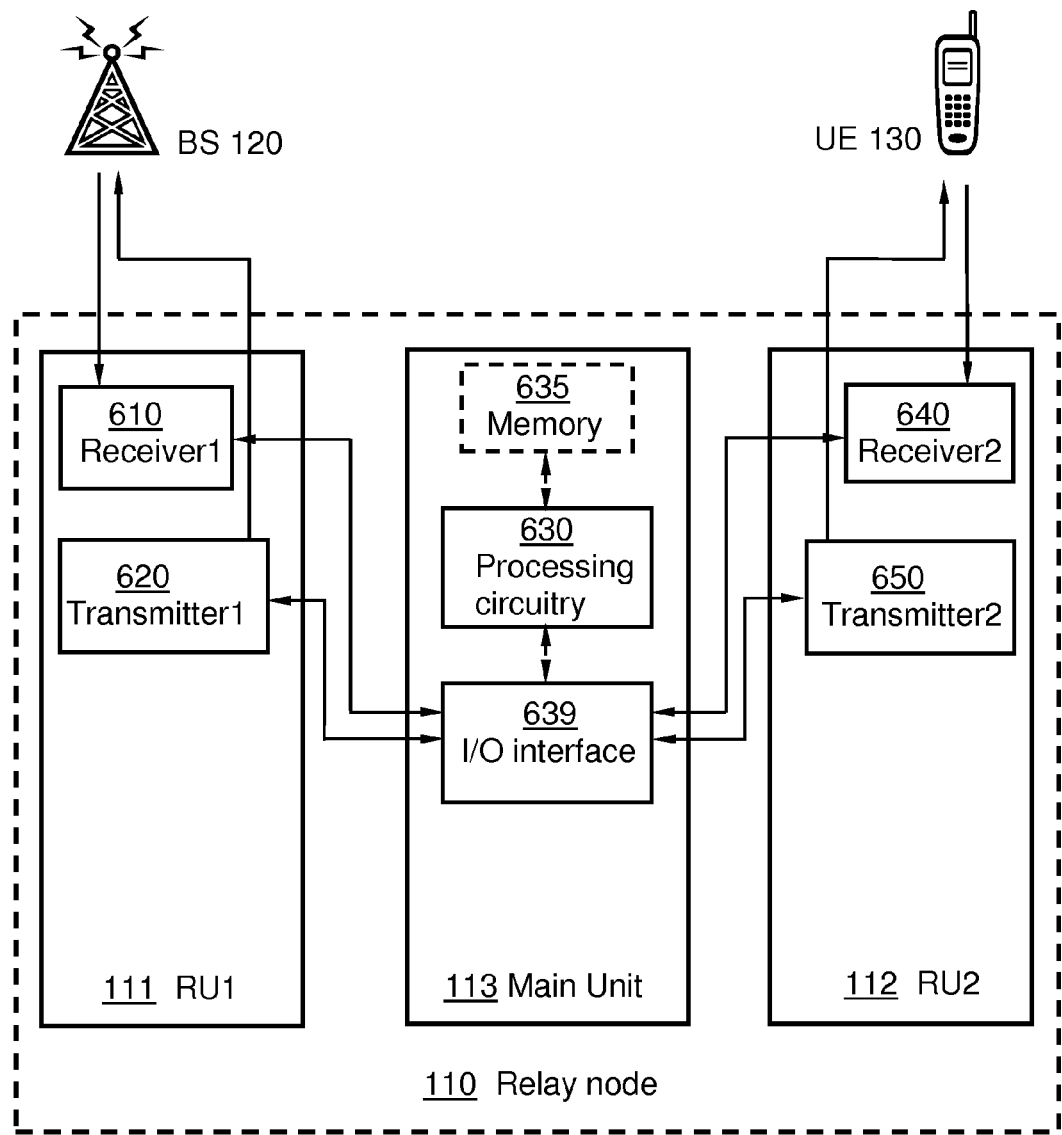
FIG. 6 is a block diagram illustrating a main unit for a relay node according to some embodiments.

FIG. 6 is a block diagram illustrating a main unit 113 for a relay node 110. The main unit 113 is connectible to a first radio unit 111 and to a second radio unit 112. The main unit 113 is configured to perform any, some or all of the actions 501-509 for synchronising wireless communication over the second radio unit 112 with wireless communication over the first radio unit 111. The main unit 113 is configured for wireless communication with a donor base station 120 via the first radio unit 111 and configured for wireless communication with a user equipment 130 via the second radio unit 112.

The main unit 113 for the relay node 110, the first radio unit 111 and the second radio unit 112 are comprised in a Main Unit - Remote Radio Unit, MU-RRU, architecture, wherein the first radio unit 111 and the second radio unit 112 are remote radio units, connected to the main unit 113, e.g. via a cable such as an optical cable.

According to some embodiments, no Orthogonal Frequency Division Multiplexing (OFDM) symbol may be reserved for the time it takes for any, or both, of the first radio unit 111 and/or the second radio unit 112 to switch between transmitting and receiving radio signals. Further, the time it takes for any, or both, of the first radio unit 111 and/or the second radio unit 112 to switch between transmitting and receiving radio signals may be less than the length of a Cyclical Prefix (CP) according to some embodiments.

For the sake of clarity, any internal electronics or other components of the main unit 113 for a relay node 110, not completely crucial for understanding the present method has been omitted from FIG. 6.

In order to perform the actions 501-509 correctly, the main unit 113 comprises an input/output interface 639, configured to communicate with the first radio unit 111 and with the second radio unit 112.

The input/output interface 639 may be configured to transmit a signal causing the first unit 111 to transmit a scheduling request, to be received by the donor base station 120, according to some embodiments.

In addition, the input/output interface 639 may be configured to transmit a signal causing the first unit 111 to transmit data, such as e.g. dummy data, over a Physical Uplink Shared Channel (PUSCH) if the scheduling request is granted. However, the input/output interface 639 may be configured to transmit a signal causing the first unit 111 to transmit other data comprising e.g. information to be sent to the donor base station 120, over a Physical Uplink Shared Channel (PUSCH) if the scheduling request is granted.

Further, alternatively, the input/output interface 639 may be configured to transmit a signal causing the first unit 111 to transmit the reference signal over Physical Random Access Channel (PRACH).

The input/output interface 639 may also be configured to transmit a signal causing the second unit 112 to transmit a Primary Synchronisation Signal (PSS), according to some embodiments.

Further, the main unit 113 comprises a processing circuitry 630. The processing circuitry 630 is configured to compute a first timing difference corresponding to the time it takes for the synchronisation signal to propagate from the second radio unit 112 to being received at the first radio unit 111. The processing circuitry 630 is further configured to adjust the downlink transmission timing at the second radio unit 112 according to the first timing difference. In addition, the processing circuitry 630 is further configured to estimate a second timing difference, corresponding to the time it takes for the reference signal to propagate from the first radio unit 111 to being received at the second radio unit 112. Also, the processing circuitry 630 is configured to adjust the expected receiving timing for signals to be received from the user equipment 130 at the second radio unit 112 according to the second timing difference.

The processing circuitry 630 may in addition be configured to synchronise the first radio unit 111 with the donor base station 120.

The processing circuitry 630 may comprise e.g. one or more instances of a Central Processing Unit (CPU), a processing unit, a processor, a microprocessor, or other processing logic that may interpret and execute instructions. The processing circuitry 630 may further perform data processing functions for inputting, outputting, and processing of data comprising data buffering and device control functions, such as call processing control, user interface control, or the like.

According to some embodiments, the main unit 113 may comprise at least one memory 635. The memory 635 may comprise a physical device utilized to store data or programs i.e. sequences of instructions, on a temporary or permanent basis. According to some embodiments, the memory 635 may comprise integrated circuits comprising silicon-based transistors. Further, the memory 635 may be volatile or non-volatile. The main unit 113 may further according to some embodiments comprise at least one volatile memory 635 and also at least one non-volatile memory 635.

Further, the relay node 110 comprising the main unit 113 comprises, according to some embodiments a first radio unit 111 configured for wireless communication with the donor base station 120 and a second radio unit 112 configured for wireless communication with the user equipment 130. The relay node 110 comprising the main unit 113, the first radio unit 111 and the second radio unit 112 is configured for synchronising wireless communication over the second radio unit 112 with wireless communication over the first radio unit 111.

Further, as illustrated in FIG. 6, the second radio unit 112 comprises a second unit transmitter 650, configured to transmit a synchronisation signal. The first radio unit 111 comprises a first unit receiver 610, configured to receive the synchronisation signal. The first radio unit 111 comprises a first unit transmitter 620 configured to transmit a reference signal, and the second radio unit 112 comprises a second unit receiver 640, configured to receive the reference signal.

The first radio unit 111 comprising the first unit receiver 610 and the first unit transmitter 620 is configured for wireless communication over a backhaul link with the donor base station 120. The second radio unit 112 comprising the second unit receiver 640 and the second unit transmitter 650 is configured for wireless communication over an access link with the user equipment 130.

Further, it is to be noted that some of the described units 630-639 comprised within the main unit 113 for the relay node 110 and/or the described units 610-650 comprised within the first radio unit 111 and/or the second radio unit 112 respectively, are to be regarded as separate logical entities but not with necessity separate physical entities. To mention just one example, the first unit receiver 610 and the first unit transmitter 620 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the donor base station 120, the relay node 110 and the user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 501-509 to be performed in the main unit 113 for a relay node 110 may be implemented through one or more processing circuitry 630 in the main unit 113, together with computer program code for performing the functions of the present actions 501-509. Thus a computer program product, comprising instructions for performing the actions 501-509 in the main unit 113 for a relay node 110 may synchronising wireless communication over the second radio unit 112 with wireless communication over the first radio unit 111, when being loaded into the one or more processing circuitry 630.

The computer program product mentioned above may be provided for instance in the form of a data carrier carrying computer program code for performing at least some of the actions 501-509 according to some embodiments when being loaded into the processing circuitry 630. The data carrier may be e.g. a hard disk, a CD ROM disc, a DVD disc, a memory stick, an optical storage device, a magnetic storage device or any other appropriate medium such as a disk or tape that may hold machine readable data in a non-transitory manner. The computer program product may furthermore be provided as computer program code on a server and downloaded to the main unit 113 of the relay node 110 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a main unit for a relay node, which main unit is connectible to a first radio unit and to a second radio unit, for synchronising wireless communication over the second radio unit with wireless communication over the first radio unit, wherein the main unit is configured for wireless communication with a donor base station via the first radio unit and configured for wireless communication with a user equipment via the second radio unit, the method comprising:
   transmitting, via the second radio unit, a synchronisation signal,
   receiving information concerning reception of the synchronisation signal at the first radio unit,
   computing a first timing difference corresponding to the time it takes for the synchronisation signal to propagate from the second radio unit to being received at the first radio unit,
   adjusting the downlink transmission timing at the second radio unit according to the first timing difference,
   transmitting, via the first radio unit, a reference signal,
   receiving information concerning reception of the reference signal at the second radio unit,
   estimating a second timing difference, corresponding to the time it takes for the reference signal to propagate from the first radio unit to being received at the second radio unit, and
   adjusting the expected timing for signals to be received from the user equipment at the second radio unit according to the second timing difference.

2. The method according to claim 1, wherein no Orthogonal Frequency Division Multiplexing, OFDM, symbol is reserved for the time it takes for any, or both, of the first radio unit and/or the second radio unit to switch between transmitting and receiving radio signals.

3. The method according to claim 1, wherein the time it takes for any, or both, of the first radio unit and/or the second radio unit to switch between transmitting and receiving radio signals is less than the length of a Cyclical Prefix, CP.

4. The method according to claim 1, further comprising:
   synchronising (501) the first radio unit with the donor base station.

5. The method according to claim 1, wherein the transmission of the reference signal via the first radio unit, is preceded by transmission of a scheduling request, transmitted via the first radio unit, to be received by the donor base station.

6. The method according to claim 5, wherein the transmission of the reference signal via the first radio unit comprises transmission of dummy data over a Physical Uplink Shared Channel, PUSCH, if the scheduling request is granted.

7. The method according to claim 1, wherein the transmission of the reference signal via the first radio unit comprises a transmission made over Physical Random Access Channel, PRACH.

8. The method according to claim 1, wherein the transmission of the synchronisation signal via the second radio unit comprises a Primary Synchronisation Signal, PSS.

9. The method according to claim 1, wherein the main unit for the relay node, the first radio unit and the second radio unit are comprised in a Main Unit-Remote Radio Unit, MU-RRU, architecture, wherein the first radio unit and the second radio unit are remote radio units, connected to the main unit.

10. The method according to claim 1, wherein
   the adjustment of the downlink transmission timing at the second radio unit according to the first timing difference comprises prolonging the downlink transmission timing with the time it takes for the synchronisation signal to propagate from the second radio unit to being received at the first radio unit, and wherein
   the adjustment of the expected timing for signals to be received from the user equipment at the second radio unit according to the second timing difference comprises prolonging the uplink transmission timing with the time it takes for the reference signal to propagate from the first radio unit to being received at the second radio unit.

11. A main unit for a relay node, which main unit is connectible to a first radio unit and to a second radio unit, for synchronising wireless communication over the second radio unit with wireless communication over the first radio unit, wherein the main unit is configured for wireless communication with a donor base station via the first radio unit and configured for wireless communication with a user equipment via the second radio unit the main unit comprising:
   an input/output interface configured to communicate with the first radio unit and the second radio unit,
   a processing circuitry configured to compute a first timing difference corresponding to the time it takes for the synchronisation signal to propagate from the second radio unit to being received at the first radio unit, which processing circuitry is further configured to adjust the downlink transmission timing at the second radio unit according to the first timing difference, and wherein the processing circuitry is further configured to estimate a second timing difference, corresponding to the time it takes for the reference signal to propagate from the first radio unit to being received at the second radio unit and to adjust the expected receiving timing for signals to be received from the user equipment at the second radio unit according to the second timing difference.

12. The main unit, according to claim 11, wherein no Orthogonal Frequency Division Multiplexing, OFDM, symbol is reserved for the time it takes for any, or both, of the first radio unit and/or the second radio unit to switch between transmitting and receiving radio signals.

13. The main unit, according to claim 11, wherein the time it takes for any, or both, of the first radio unit and/or the second radio unit to switch between transmitting and receiving radio signals is less than the length of a Cyclical Prefix, CP.

14. The main unit, according to according to claim 11, wherein the processing circuitry is configured to synchronise the first radio unit with the donor base station.

15. The main unit, according to claim 11, wherein the input/output interface is configured to transmit a signal causing the first unit to transmit a scheduling request, to be received by the donor base station.

16. The main unit, according to claim 15, wherein the input/output interface is configured to transmit a signal causing the first unit to transmit dummy data over a Physical Uplink Shared Channel, PUSCH, if the scheduling request is granted.

17. The main unit, according to claim 11, wherein the input/output interface is configured to transmit a signal causing the first unit to transmit the reference signal over Physical Random Access Channel, PRACH.

18. The main unit, according to claim 11, wherein the input/output interface is configured to transmit a signal causing the second unit to transmit a Primary Synchronisation Signal, PSS.

19. The main unit, according to claim 11, wherein the main unit for the relay node, the first radio unit and the second radio unit are comprised in a Main Unit-Remote Radio Unit, MU-RRU, architecture, wherein the first radio unit and the second radio unit are remote radio units, connected to the main unit.

20. A relay node comprising a main unit according to claim 11, further comprising a first radio unit configured for wireless communication with a donor base station and a second radio unit configured for wireless communication with a user equipment, for synchronising wireless communication over the second radio unit with wireless communication over the first radio unit, wherein
- the second radio unit comprises a second unit transmitter, configured to transmit a synchronisation signal,
- the first radio unit comprises a first unit receiver, configured to receive the synchronisation signal,
- the first radio unit comprises a first unit transmitter configured to transmit a reference signal, and
- the second radio unit comprises a second unit receiver, configured to receive the reference signal.

* * * * *

UNITED STATES PATENT AND TRADEMARK OFFICE
CERTIFICATE OF CORRECTION

| | | |
|---|---|---|
| PATENT NO. | : 8,837,373 B2 | Page 1 of 1 |
| APPLICATION NO. | : 13/642940 | |
| DATED | : September 16, 2014 | |
| INVENTOR(S) | : Gan et al. | |

It is certified that error appears in the above-identified patent and that said Letters Patent is hereby corrected as shown below:

In the Specification

In Column 3, Line 39, delete "prefix (4.7 ps in" and insert -- prefix (4.7 μs in --, therefor.

In the Claims

In Column 14, Line 39, in Claim 11, delete "radio unit" and insert -- radio unit, --, therefor.

In Column 14, Line 40, in Claim 11, delete "interface" and insert -- interface, --, therefor.

In Column 14, Line 56, in Claim 12, delete "main unit," and insert -- main unit --, therefor.

In Column 14, Line 61, in Claim 13, delete "main unit," and insert -- main unit --, therefor.

In Column 14, Line 65, in Claim 14, delete "main unit, according to" and insert -- main unit --, therefor.

In Column 15, Line 1, in Claim 15, delete "main unit," and insert -- main unit --, therefor.

In Column 15, Line 5, in Claim 16, delete "main unit," and insert -- main unit --, therefor.

In Column 15, Line 10, in Claim 17, delete "main unit," and insert -- main unit --, therefor.

In Column 15, Line 14, in Claim 18, delete "main unit," and insert -- main unit --, therefor.

In Column 15, Line 18, in Claim 19, delete "main unit," and insert -- main unit --, therefor.

Signed and Sealed this
Second Day of June, 2015

Michelle K. Lee
*Director of the United States Patent and Trademark Office*